(12) United States Patent
Kleiner et al.

(10) Patent No.: US 10,990,502 B2
(45) Date of Patent: Apr. 27, 2021

(54) DETAILED PERFORMANCE ANALYSIS BY FLOW AWARE MARKER MECHANISM

(71) Applicant: EMC IP Holding Company LLC, Hopkinton, MA (US)

(72) Inventors: Vladimir Kleiner, Yehud (IL); Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 318 days.

(21) Appl. No.: 16/260,222

(22) Filed: Jan. 29, 2019

(65) Prior Publication Data
US 2020/0241998 A1    Jul. 30, 2020

(51) Int. Cl.
*G06F 11/34*     (2006.01)
*G06F 16/901*    (2019.01)

(52) U.S. Cl.
CPC ...... *G06F 11/3495* (2013.01); *G06F 11/3409* (2013.01); *G06F 16/9024* (2019.01); *G06F 2201/86* (2013.01); *G06F 2201/88* (2013.01)

(58) Field of Classification Search
CPC ............ G06F 11/3006; G06F 11/3017; G06F 11/3034; G06F 11/323; G06F 11/3409; G06F 11/3466; G06F 11/3495; G06F 11/366; G06F 16/9024; G06F 2201/86; G06F 2201/88
USPC ........................................................ 702/182
See application file for complete search history.

(56) References Cited

U.S. PATENT DOCUMENTS

| | | | |
|---|---|---|---|
| 9,430,287 B2 * | 8/2016 | Zaroo | G06F 9/5044 |
| 10,747,453 B2 * | 8/2020 | Kleiner | G06F 3/065 |
| 2018/0276042 A1 * | 9/2018 | Toal | G06F 11/3409 |

* cited by examiner

*Primary Examiner* — John H Le
(74) *Attorney, Agent, or Firm* — Daly, Crowley Mofford & Durkee, LLP

(57) ABSTRACT

According to aspects of the disclosure, a method is provided comprising: executing a set of threads in a storage system, the set of threads including at least a first thread; executing a plurality of performance counters of the storage system, the plurality of performance counters including at least: (i) a first performance counter that is executed when an operating state of the first thread is changed in response to the first thread accessing a synchronization object, and (ii) a second performance counter that is executed when a marker inserted in the first thread is executed; generating one or more performance data containers associated the first thread based on performance data associated with the first thread; and generating a directed graph based on the performance data containers.

20 Claims, 10 Drawing Sheets

310

DETAILED PERFORMANCE ANALYSIS BY FLOW AWARE MARKER MECHANISM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: executing a set of threads in a storage system, the set of threads including at least a first thread; executing a plurality of performance counters of the storage system, the plurality of performance counters being executed concurrently with the set of threads, the plurality of performance counters including at least: (i) a first performance counter that is executed when an operating state of the first thread is changed in response to the first thread accessing a synchronization object, and (ii) second performance counter that is executed when a marker inserted in the first thread is executed; generating one or more performance data containers associated the first thread based on performance data associated with the first thread; and generating a directed graph based on the performance data containers, the directed graph including a plurality of nodes connected to one another by a plurality of edges, the plurality of nodes including a first node corresponding to the synchronization object, and a second node corresponding to the marker.

According to aspects of the disclosure, a system is provided comprising: a memory; and one or more processors operatively coupled to the memory, the one or more processors being configured to perform the operations: executing a set of threads in a storage system, the set of threads including at least a first thread; executing a plurality of performance counters of the storage system, the plurality of performance counters being executed concurrently with the set of threads, the plurality of performance counters including at least: (i) a first performance counter that is executed when an operating state of the first thread is changed in response to the first thread accessing a synchronization object, and (ii) a second performance counter that is executed when a marker inserted in the first thread is executed; generating one or more performance data containers associated the first thread based on performance data associated with the first thread; and generating a directed graph based on the performance data containers, the directed graph including a plurality of nodes connected to one another by a plurality of edges, the plurality of nodes including a first node corresponding to the synchronization object, and a second node corresponding to the marker.

According to aspects of the disclosure, a non-transitory computer-readable medium is provided that is configured to store processor-executable code. Which when executed by at least one processor causes the at least one processor to execute the operations of: executing a set of threads in a storage system, the set of threads including at least a first thread; executing a plurality of performance counters of the storage system, the plurality of performance counters being executed concurrently with the set of threads, the plurality of performance counters including at least: (i) a first performance counter that is executed when an operating state of the first thread is changed in response to the first thread accessing a synchronization object, and (ii) a second performance counter that is executed when a marker inserted in the first thread is executed; generating one or more performance data containers associated the first thread based on performance data associated with the first thread; and generating a directed graph based on the performance data containers, the directed graph including a plurality of nodes connected to one another by a plurality of edges, the plurality of nodes including a first node corresponding to the synchronization object, and a second node corresponding to the marker.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 8 is a block diagram of an example of a hardware device that may perform at least a portion of the processes in FIGS. 4 and 5 in accordance with.

DETAILED DESCRIPTION

Figure 1:
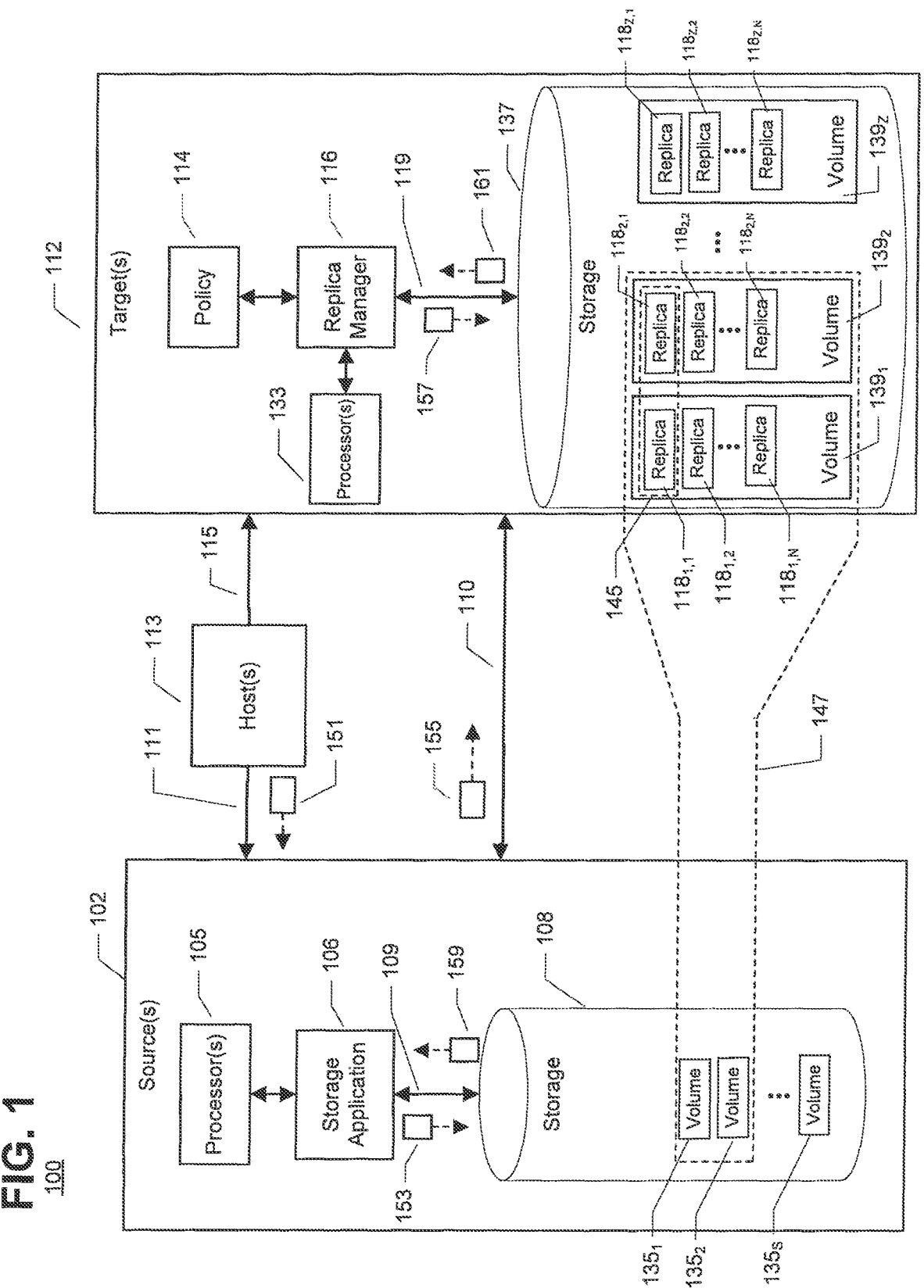
FIG. 1 is a block diagram of an example of a storage system in accordance with an illustrative embodiment.

FIG. 1 shows an example storage system 100, in accordance with illustrative embodiments. Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform operations to replicate data from source site 102 to target site 112 over communication link 110. In some embodiments, communication link 110 may be a long-distance communication link of a storage area network (SAN), such as an Ethernet or Internet (e.g., TCP/IP) link that may employ, for example, the iSCSI protocol. In some embodiments, one or both of source site 102 and/or target site 112 may include one or more internal (e.g., short distance) communication links (shown as communication links 109 and 119), such as an InfiniBand (IB) link or Fiber Channel (FC) link. Communication link 109 may be employed to transfer data between storage volumes $135_{1-S}$ of storage 108 and one or both of storage application 106 and processor(s) 105. Communication link 119 may be employed to transfer data between storage volumes $139_{1-Z}$ of storage 137 and one or both of replica manager 116 and processor(s) 133.

In illustrative embodiments, target site 112 may include replica manager 116 that manages a plurality of replicas $118_{1-N}$ according to a policy 114 (e.g., a replication and/or retention policy). Replicas 118 may be stored in one or more volumes $139_{1-Z}$ of storage 137 of target site 112. A replica (or snapshot) may be created from data within storage 108 and transferred to one or more target sites 112 during a data replication cycle that may be performed based on data replication policies (e.g., policy 114) that may define various settings for data recovery operations. A data replication cycle may be asynchronous data replication performed at time-based intervals during operation of storage system 100, or may alternatively be synchronous data replication performed when data is changed on source site 102.

In illustrative embodiments, storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time and stored on associated ones of target volumes 139. As shown in FIG. 1, an illustrative consistency group 147 may include two source volumes $135_1$ and $135_2$ and two target volumes $139_1$ and $139_2$. Each of target volumes $139_1$ and $139_2$ may include one or more replicas 118. In some embodiments, replicas 118 for respective source volumes 135 of consistency group 147 may be grouped into sets (e.g., a snapshot set or snapset 145).

Figure 2:
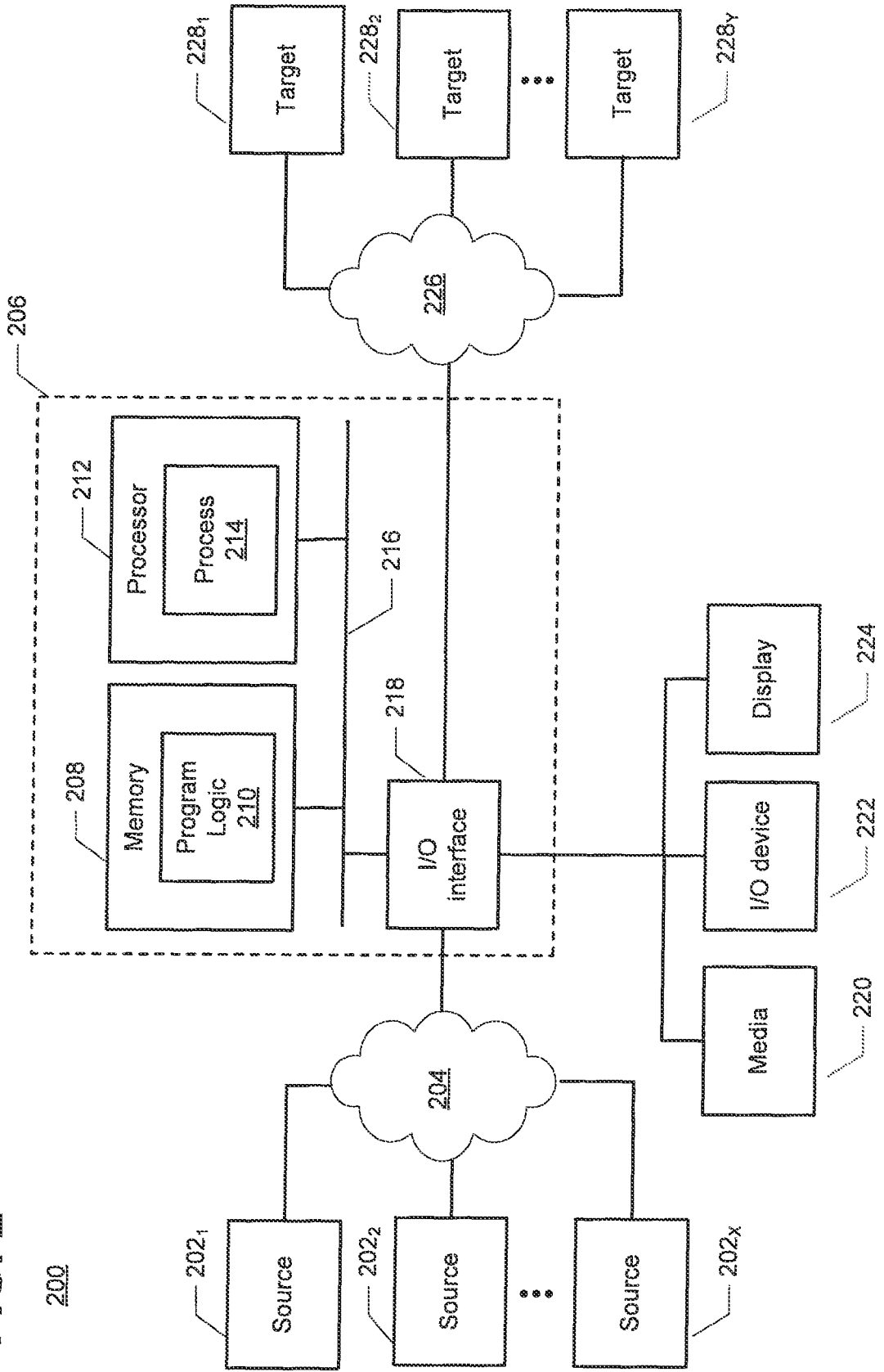
FIG. 2 is a block diagram of another example of a storage system in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Figure 3A:
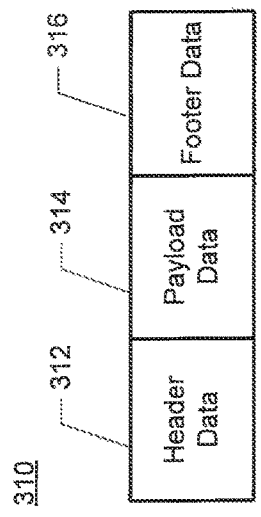
FIG. 3A is a block diagram of an example data packet of an input/output (I/O) operation of the storage system of FIG. 1 in accordance with an illustrative embodiment.

Referring back to FIG. 1, in some embodiments, one of hosts 113 may send an I/O request (e.g., I/O request 151) to perform an I/O operation on storage 108 of source site 102. For example, I/O request 151 may be a request to read an associated amount of data from storage 108, or may be a request to write an associated amount of data to storage 108. In some embodiments, I/O request 151 may include one or more data packets. For example, FIG. 3A shows a block diagram of an illustrative data packet 310. As shown in FIG. 3A, in some embodiments, data packet 310 may include one or more of header data 312, payload data 314 and footer data 316. Payload data 314 may be the data to be written to storage 108 or data that is read from storage 108 (e.g., user data), and header data 312 and/or footer data 316 may be data associated with I/O request 151 that may be employed by storage system 100 to process I/O request 151 (e.g., source and/or destination address information, error correction information, data and/or packet format information, metadata, and other information).

In some embodiments, payload data 314 may be segmented into one or more payload data segments to be written to storage 108 (e.g., by one or more write operations 153) or read from storage 108 (e.g., by one or more read operations 159). For example, if payload data 314 is 256 KB, payload data 314 may be segmented into sixteen 16 KB payload data segments to be written to storage 108. When I/O request 151 is a write request, processor(s) 105 and/or storage application 106 may then perform one or more corresponding write operations (e.g., write operation 153) to write payload data associated with the one or more data packets (e.g., one or more payload data segments) of I/O request 151 to storage 108. When I/O request 151 is a read request, processor(s) 105 and/or storage application 106 may then read data from storage 108 in one or more packets (e.g., one or more read operations 159) to process I/O request 151 from storage 108.

In illustrative embodiments, source site 102 may send a replica (e.g., replica 155) to target site 112. Similarly, to write request 151, replica 155 may include one or more data packets such as shown in FIG. 3A. Processor(s) 133 and/or replica manager 116 may then perform one or more corresponding write operations (e.g., write operation 157) to write payload data (e.g., one or more payload data segments) associated with the one or more data packets of replica 155 to storage 137. Similarly, replica manager 161 may read replica data from storage 137 by one or more read operations. In some embodiments, data packet 310 may be a data packet formatted in accordance with the TCP/IP and iSCSI protocols.

Figure 3B:
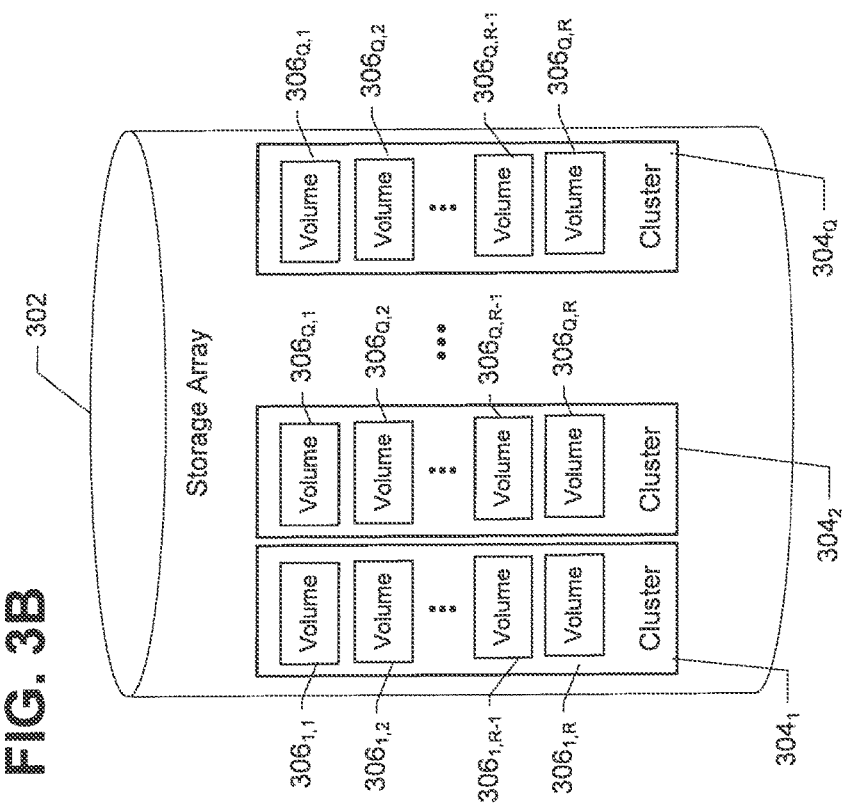
FIG. 3B is a block diagram of an example storage array of the storage system of FIG. 1 in accordance with an illustrative embodiment.

Referring to FIG. 3B, a block diagram of an illustrative storage array 302 is shown. For example, in illustrative embodiments, one or both of storage 108 and storage 137 may be implemented as storage array 302. As shown, in some embodiments, storage array 302 may include one or more clusters $304_1$-$304_Q$ (referred to generally as clusters 304) where Q may be a positive integer. In illustrative embodiments, clusters 304 may include one or more physical and/or virtual storage volumes, shown generally as storage volumes 306. For example, cluster $304_1$ may include storage volumes $306_{1,1}$-$306_{1,R}$, where R may be a positive integer. For example, clusters 304 may include one or more physical storage volumes such as hard disk drives (HDDs), solid state drives (SSDs) such as flash drives, a hybrid magnetic and solid-state drive, etc., and/or one or more virtual storage volumes, such as a cloud storage, or a combination of physical storage volumes and virtual storage volumes.

Described embodiments provide performance analysis of storage system 100. Some embodiments may employ one or more performance counters associated with resources of storage system 100 (e.g., CPU resources, operating system resources, etc.), and one or more application-specific or task-specific performance counters associated with individual applications, services or tasks of storage system 100. Described embodiments provide a manner for identifying relationships between the various performance counters and the application flow without requiring manual instrumentation upgrades with each new version of operating system (OS) software for storage system 100.

Figure 3C:
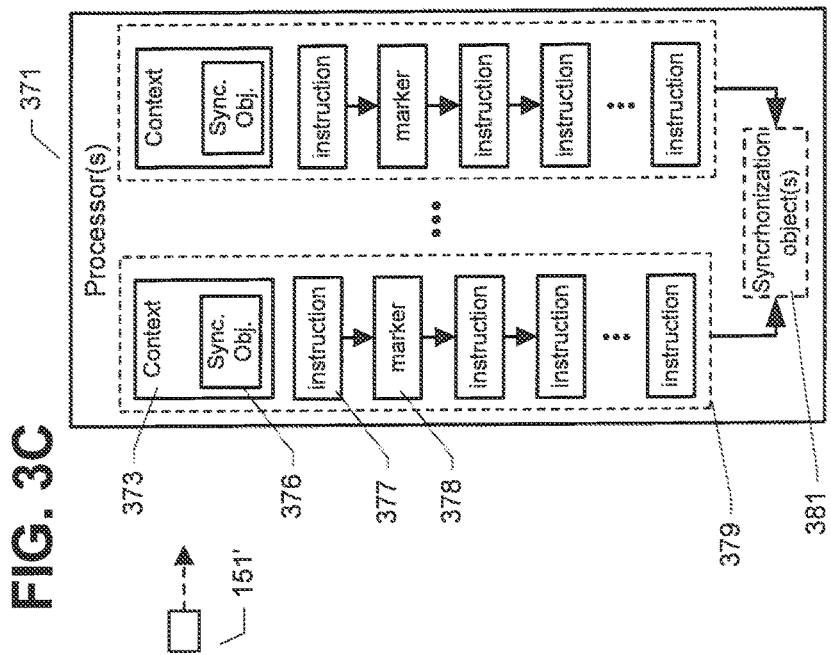
FIG. 3C is a block diagram showing example threads of the storage system of FIG. 1 in accordance with an illustrative embodiment.

Described embodiments may employ one or more threads to perform operations of storage system 100 (e.g., operations associated with I/O request 151). For example, as shown in FIG. 3C, processors 371 (e.g., one or more or processors 105 and/or processors 133) may employ one or more threads 379. Each thread 379 may be a thread of one or more instructions 377 that are performed by storage system 100. Each thread 379 may also markers 378 embedded within the instructions 377. The function of the markers 378 is discussed further below with respect to FIGS. 4-8. Furthermore, each thread 379 may also include context 373. Context 373 may include one or more synchronization objects 376. In some embodiments, threads 379 may optionally be in communication with one or more external synchronization objects 381. For example, synchronization objects 376 and/or 381 may include a lock, a semaphore, or an event, by which threads may communicate with one another.

Illustrative embodiments may monitor performance of threads (e.g., 379) that are grouped by the application-level task the threads perform. For example, some embodiments may group threads based on the thread's entry function and/or an additional operation code.

Some embodiments may monitor performance of tasks using directed-graphs (diagrams). The performance data may be collected in one or more points-of-interest into performance data containers. Performance data containers may be presented as nodes and edges of the directed-graph related to a specific task. For example, a performance data container may be represented as a node of a directed-graph for a specific task. An example of a performance data container that may be represented as a node is an OS synchronization object (e.g., synchronization objects 376 and/or 381 of FIG. 3C). Sequences of processor instructions (e.g., instructions 377 of FIG. 3C) between two nodes may be represented as edges of a directed-graph for a specific task, Since each node represents a system resource, data structure or a stage of processing for a given task, the directed-graph provides a visual representation of processing flows for a given task.

Figure 4A:
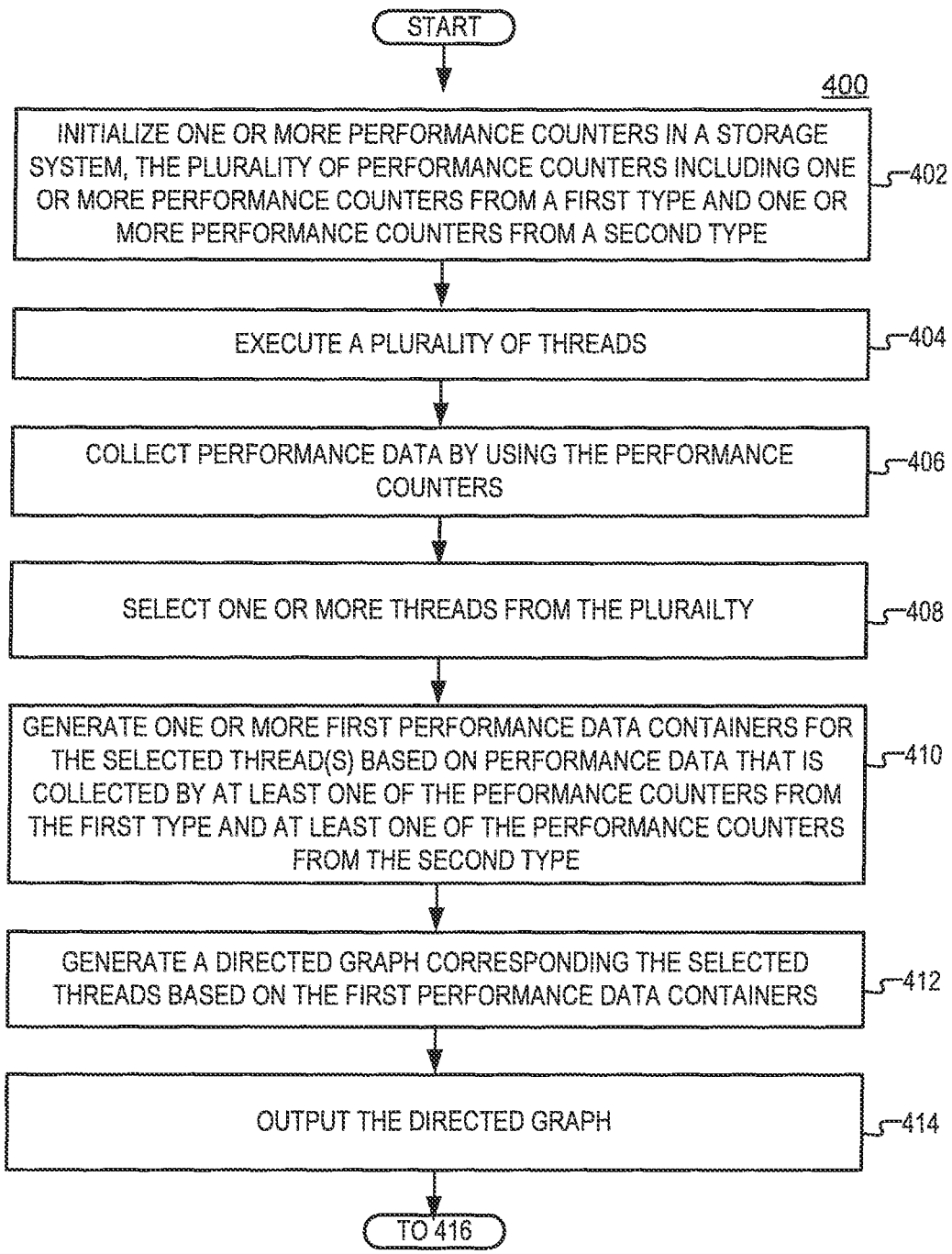
FIG. 4A is a flowchart of a first portion of a process, according to aspects of the disclosure.
Figure 4B:
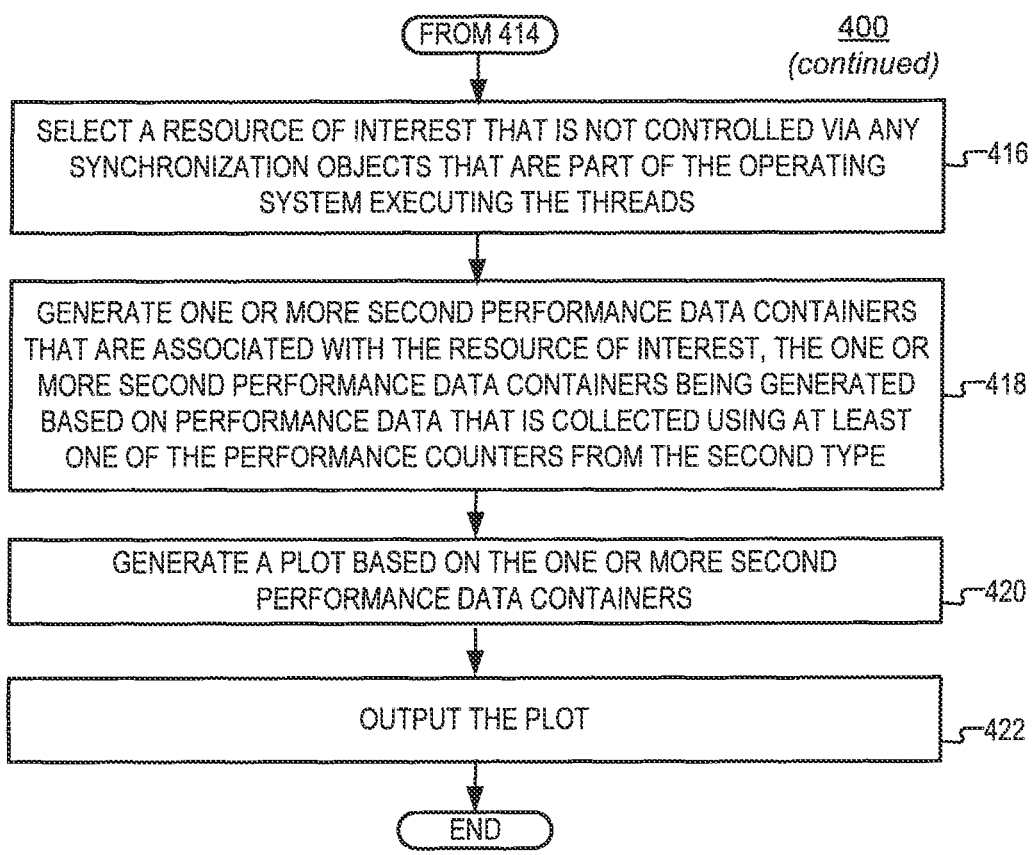
FIG. 4B is a flowchart of a second portion of the process of FIG. 4A, according to aspects of the disclosure.

FIGS. 4A-B show a flowchart of an example of a process 400 for visualizing performance data associated with the execution of one or more threads in a storage system, according to aspects of the disclosure. At step 402, a plurality of performance data counters is initialized in the storage system. According to the present example, each of the performance data counters may include data structures for storing raw performance data, and/or logic (e.g., processor-executable instructions) for collecting the raw performance data. The raw performance data may include statistical information about the use and/or utilization of one or more resources of the storage system. The resources may be either hardware resources or software resources. Examples of hardware resources include processor time, memory usage, network bandwidth. Examples of software resources include synchronization objects and/or any other suitable type of data structures. In some implementations, the raw performance data may be specific to a thread or group of threads. In such implementations, the raw performance data may indicate how much time the thread(s) have spent waiting for a particular resource to become available or how much time the thread(s) have spent in one of the RUNNING, SUSPENED, READY operating states before and/or after the thread(s) have accessed a particular resource.

The plurality of performance counters may include two types of performance counters, herein referred to as "first type" and "second type" of counters. Counters from the first type may be integrated into a scheduler of the storage system and the counters from the second type may be integrated within an application programming interface (API) that is separate from the scheduler. The counters from the first type and the second type can both be used to collect raw performance data associated with one or more threads. However, the counters from the first type do not require any modification of the threads in order for their execution to be triggered, whereas the counters from the second type require the insertion of markers into the threads.

As is further discussed below, because the first type of counters are placed in the scheduler of the storage system, there is no need to modify the code of the threads in order for the counters from the first type to be executed—rather, the counters from the first type can be executed automatically when the operational states of the threads are changed by the scheduler. On the other hand, because the counters from the second type are located outside of the scheduler, their execution is triggered by markers, which are placed inside the code of the threads that are being monitored. These markers may include one or more processor executable instructions that are configured to call a function in the API that implements the second type of counters. In addition, the markers may provide the function with corresponding resource IDs and/or other information that is necessary for collecting performance data.

Embedding the counters from the first type in the scheduler permits them to register performance data when threads change their operational state. Such counters may take advantage of the way in which threads are scheduled when they access synchronization objects. More particularly, when a given thread is executed, it may continue executing until it reaches a point at which the given thread performs an access of a synchronization object. At this point, the thread is suspended while the access to the synchronization object is pending, and another thread begins executing until the other thread also performs an access of another synchronization object. In other words, placing the counters from the first type in the scheduler enables the scheduler to record performance data as it changes the operational state of its constituent threads over the course of the scheduler's normal operation. Because synchronization objects may control access to various resources in the storage system, timing the collection of performance data to scheduling events associated with the objects allows the collected performance data to describe, or otherwise reflect, the pattern at which resources of the storage system are accessed and used by various threads in the storage system.

In some respects, while recording points placed in the scheduler have a high temporal resolution, in some cases they still may lack sufficient detail. In this regard, embedding markers into threads that are monitored may introduce an additional set of recording points, which allows additional performance data to be collected by performance counters from the second type. In some implementations, the integration of markers into the threads may be advantageous because it allows more detailed information to be obtained about time spent on different logically separated fragments/subsections of any processing sequence that is located between consecutive scheduling points. Furthermore, the integration of markers into the threads may be advantageous because it allows the monitoring of resources that are not accessed via synchronized objects, such as non-volatile random-access memory (nvRAM).

At step 404, a plurality of threads is executed using the scheduler. In some implementations, the threads may include threads that are arranged to perform various operations in the storage system, such as journaling, destaging, etc. Initializing any of the threads may include instantiating the thread, selecting the thread from a pool of available threads, executing the thread and/or any other suitable action. One or more of the plurality of threads may include markers embedded therein.

At step 406, the performance data counters are executed and a set of raw performance data is collected as a result. According to the present example, the performance data counters are executed concurrently with the execution of any of the plurality of threads. The manner in which the performance data counters are executed is discussed further below with respect to FIG. 5.

At step 408, one or more threads are selected from the plurality of threads. In some implementations, the selected threads may be selected based on their respective task IDs. For example, in instances when multiple threads are selected, all selected threads may have the same task ID. In some implementations, the task ID of any thread may be based on the entry function (identifier) and/or opcode of the thread.

At step 410, one or more first performance data containers are generated by aggregating performance data stored in the performance counters. According to the present example, the aggregated performance data may include performance data collected by one or more performance counters from the first type and performance data collected by one or more performance counters from the second type. Each of the first performance data containers may include one or more data structures. The performance data stored in any of the first performance data containers may include at least one of: (i) raw data that is obtained from the performance data counters or (ii) data that is generated based on the raw data. For example, raw data may include timestamps indicating when a given thread has changed states, and data that is generated based on this raw data may include the duration of the periods spent in each state. In some implementations, each of the first performance data containers may include only performance data that is associated with the task ID of the thread(s) selected at step 408.

At step 412, a flow graph is generated based on the performance data. The flow graph may include a plurality of nodes connected to one another by edges. The plurality of nodes may include one or more first nodes and one or more second nodes. Each one of the first nodes may correspond to a different synchronization object (e.g., an object identified in the performance data) that is accessed by the one or more, threads selected at step 410. Each one of the second nodes may correspond to a different marker (e.g., a marker identified in the performance data) that is embedded in the threads. Each of the edges may correspond to a processing sequence (e.g., one or more processor-executable instructions) that is executed between different recording points. For example: (i) an edge that extends between two first nodes may represent a processing sequence that is executed after accessing the synchronization object corresponding to one of the first nodes and before accessing the synchronization object corresponding to the other one of the first nodes; (ii) an edge that extends between two second nodes may represent a processing sequence that is executed after the marker corresponding to one of the first node and before the marker corresponding to the other one of the second nodes; (iii) an edge that extends from a first node to a second node may represent a processing sequence that is executed after accessing the synchronization object corresponding to the first node and before executing the marker corresponding to the second node; and (iv) a node that extends from a second node to a first node may represent a processing sequence that is executed after the marker corresponding to the second node and before accessing the synchronization object corresponding to the first node.

In some implementations, generating the flow graph may include scanning the performance data containers generated at step 410 to identify one or more synchronization objects that were accessed by the threads and one or more executed markers that are embedded in the threads. Afterwards, a node representation may be created for each synchronization object that has been accessed. Similarly, a node representation may be created for each marker that has been executed. In addition, generating the flow graph may also include generating a plurality of edge representations, wherein each edge representation corresponds to a different processing sequence that is executed: (i) after a first synchronization object is accessed or a first marker is executed and (ii) before a second synchronization object is accessed or a second marker executed.

Figure 6:
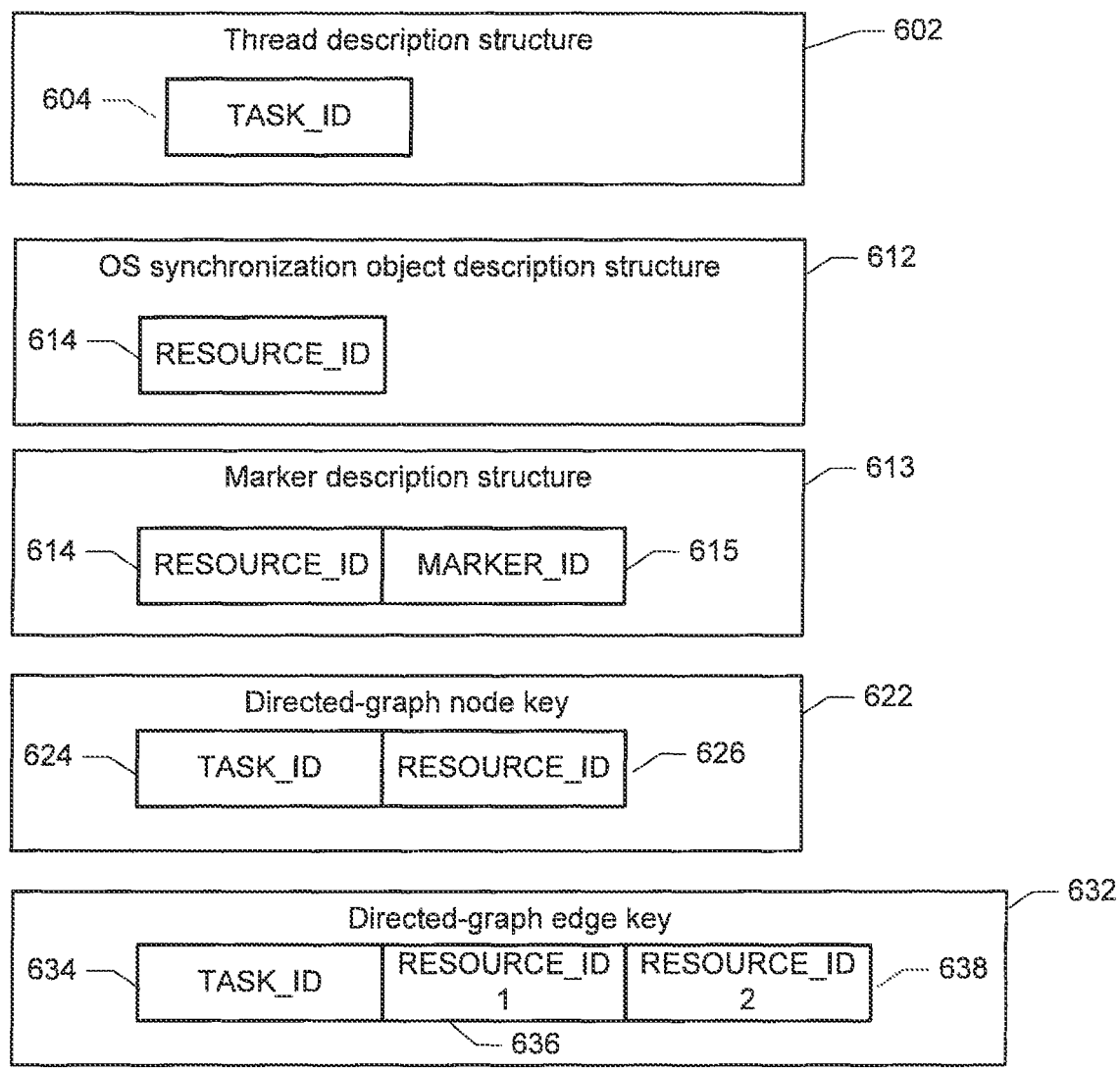
FIG. 6 is a block diagram of illustrative data structures used by the process of FIGS. 4A-B in accordance with an illustrative embodiment.

FIG. 6 shows an example of data structures that can be used to represent the nodes and edges that make up the directed flow graph. As shown, a respective thread description structure 602 may be used to identify each of the threads selected at step 408. Each thread description structure may include a TASK_ID 604 that is associated with the thread represented by the structure. A respective OS synchronization object description structure 612 may by used to describe each of the synchronization objects accessed by the threads. Each OS synchronization object description structure 612 may include a RESOURCE_ID 614 that is associated with the synchronization object represented by the structure. A respective marker description structure 613 may be used to identify each of the markers embedded in the threads that are executed. Each marker description structure 613 may include an associated RESOURCE_ID 614 of the resource which the marker represented by the structure is intended to monitor and a marker ID corresponding to the marker. A respective directed-graph node key 622 may be used to represent each of the nodes in the flow graph. Each directed-graph node key 622 may include an associated TASK_ID 624 and an associated RESOURCE_ID 626. A respective directed-graph edge key 632 may be used to represent each of the edges in the flow graph. Each directed-graph edge key 632 may include an associated TASK_ID 634, an associated first RESOURCE_ID 636, and an associated second RESOURCE_ID 638 that define the processing sequence of instructions corresponding to the edge which the key represents. In some implementations, performance data counters may be collected for each graph node and for each graph edge.

Returning to FIGS. 4A-B, at step 414, at least a portion of the flow graph is output. In some implementations, outputting the flow graph may include storing the flow graph in a memory. Additionally or alternatively, in some implementations, outputting the flow graph may include transmitting the flow graph, over a communications network, from a computing device executing the process 400 to another computing device (e.g., a computing device of a developer of the software system). Additionally or alternatively, in some implementations, outputting the flow graph may include rendering the flow graph on an output device, such as a display screen or a printer. In some implementations, after the flow graph is output, the flow graph can be used by software developers to debug the storage system to improve its efficiency and remove software bugs that have caused increased resource consumption and/or degradation of system performance. In this regard, the process for generating and outputting the flow graph which is presented with respect to FIGS. 4A-B may be used to improve the manner in which various development tools collect and analyze data. Furthermore, when the flow graph is displayed within the user interface of various debugging and development tools, this may enable the tools to provide information regarding the execution flow of threads that are monitored.

At step 416, a resource of the computing system is selected that is not accessed via any synchronization objects. Resources in any storage system (or another type of software system) can be accessed either by using synchronization objects or without using synchronization objects. According to the present example, performance data associated with resources that are accessed via synchronization objects is collected by using the counters from the first type, even though it can also be collected with the counters from the second type as well. By contrast, performance data associated with resources that are not accessed via synchronization objects, that are part of the operating system executing the scheduler, cannot be collected by using the performance counters from the first type because accesses to such resources do not result in events that cause the scheduler to change the operating state of a thread that is being executed. For this reason, according to the present disclosure, the second type of counters (which rely on markers) are used for the collection of performance data that is associated with resources that are not accessed via any synchronization objects.

At step 418, one or more second performance data containers are generated that include performance data relating to the use of the selected resource by one or more of the threads executed at step 404. The performance data stored in the second performance data containers may include at least one of: (i) raw data that is obtained from the performance data counters from the second type or (ii) processed data that is generated based on the raw data.

At step 420, a plot is generated based on the one or more performance data containers. In some implementations, the generated plot may be the same or similar to the plot 700D, which is shown in FIG. 7D. As illustrated in FIG. 7D, the plot may illustrate the total rate at which the selected resource is accessed by two different threads. Furthermore, the plot may illustrate the proportion of the total access rate which is individually attributable to each one of the threads. Although in the present example, a plot is generated that identifies the respective count of accesses of a resource that are performed by different threads, it will be understood that alternative implementations are possible in which performance data that is collected using markers may be used to generate a plot showing the count of accesses performed by different sections of the same thread. In this regard, it will be understood that performance data that is collected by using the performance counters from the second type (i.e., the performance counters that rely on markers) may be used to monitor and compare the operation of different portions of the same thread that are not separated by accesses to one or more synchronization objects.

At step 422, the plot is output. In some implementations, outputting the plot may include storing the plot in a memory. Additionally or alternatively, in some implementations, outputting the plot may include transmitting the plot, over a communications network, from a computing executing the process 400 to another computing device (e.g., a computing device of a developer of the software system). Additionally or alternatively, in some implementations, outputting the plot may include rendering the plot on an output device, such as a display screen or a printer. In some implementations, after the plot is output, the plot can be used by software developers to debug the storage system to improve its efficiency and/or remove software bugs causing increased resource consumption and/or degradation in system performance.

Figure 5:
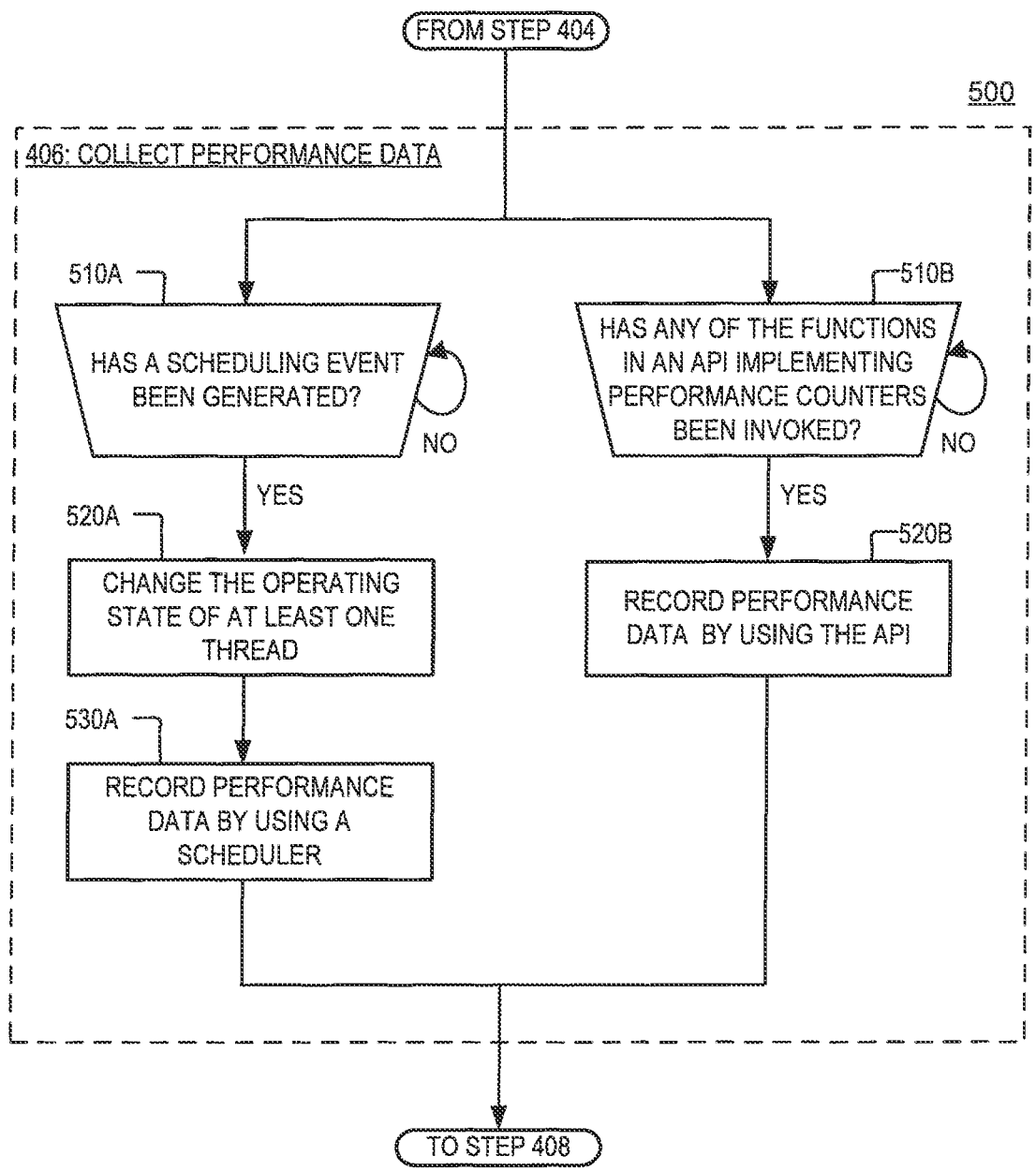
FIG. 5 is a flow diagram of an example of a process in accordance with an illustrative embodiment.

FIG. 5 is a diagram of an example of a process for collecting performance data, as specified by step 406 of the process 400. As illustrated, the process 500 includes two branches. The first branch includes steps 510A, 520A, and 530A and it is executed by the scheduler of the storage system, which implements the performance counters from the first type. The second branch includes steps 510B and 520B and it is executed by the API implementing the second type of performance counters. According to the present example, the two branches are executed concurrently. However, alternative implementations are possible in which the two branches are executed sequentially.

At step 510A a determination is made if a scheduling event has been generated within the storage system. According to aspects of the disclosure, the scheduling event may include any event that causes the scheduler to change the operating state of at least one thread. In some implementations, one or more scheduling events may be generated when a thread accesses a synchronization object that is configured to coordinate the use of a resource shared among multiple threads in the storage system. If a scheduling event has been generated, the process 500 proceeds to step 520A. Otherwise, if no scheduling events have been is generated, step 510A is executed again.

At step 520A, the operating state of one or more threads is changed. For example, changing the state of a running thread may include suspending the thread (i.e., transitioning the thread into a SUSPENDED state). As another example, changing the state of a suspended thread may include transitioning the thread into a READY state. As yet another example, changing the state of a thread that is currently in the READY state may include executing the thread (i.e., transitioning the thread into a RUNNING state).

At step 530A, one or more performance counters from the first type are executed. As a result of the execution, performance data is generated and stored in the memory of the storage system. The execution of the performance data counters is triggered by the change in the operating state of the one or more threads, which takes place in step 520A. Any item of generated performance data may be stored in such a way that the item is mapped to the task ID of at least one of the threads whose operating states are changed. Additionally or alternatively, in some implementations, any item of the performance data may indicate a degree of utilization (or another characteristic of use) of a resource that is used by any of the threads whose operating states are changed. In such implementations, any such item of performance data may be stored in such a way that it is also mapped to a resource ID corresponding to the resource. As can be readily appreciated, mapping performance data to task IDs and resource IDs is advantageous because it allows the performance data to be searched and/or aggregated based on the resource IDs and task IDs when performance data containers are generated at steps 412/418.

At step 510B, a determination is made if any of the functions in the API implementing the second type of counters have been invoked by a marker embedded in one of the threads executed at step 404. The invoked functions may include functions that implement the counters from the second type or functions that are configured to trigger the execution of the counters from the second type. If any of the functions have been invoked, the process 500 proceeds to step 520B. Otherwise, if no functions have been invoked, step 510B is executed again.

At step 520B, one or more of the counters from the second type are executed. As a result of the execution of the performance counters, performance data is generated and stored. Any item of generated performance data may be stored in such a way that the item is mapped to one or more of a resource ID corresponding to a resource associated with the performance data, the task ID of the thread containing the marker and/or a marker ID corresponding to the marker that has triggered the execution of the one or more counters. As can be readily appreciated, mapping performance data to task IDs and resource IDs allows the performance data to be searched and/or aggregated based on the resource IDs and task IDs.

In some implementations, the marker ID and/or resource ID associated with any item of performance data may be provided as input to the API by the marker invoking it. For example, when a marker is desired to monitor the use of a resource (e.g., nvRAM) that is not accessed via any synchronization objects that are part of the storage system's operating system, the marker can be placed before or after instructions in the thread that accesses the resource. Furthermore, the marker may be configured to provide to the API a resource ID corresponding to the resource when the marker is executed. The provided resource ID may than be mapped to any performance data that is recorded by the performance counters in the API, and subsequently used as a search key for the retrieval of the recorded performance data.

Figure 7A:
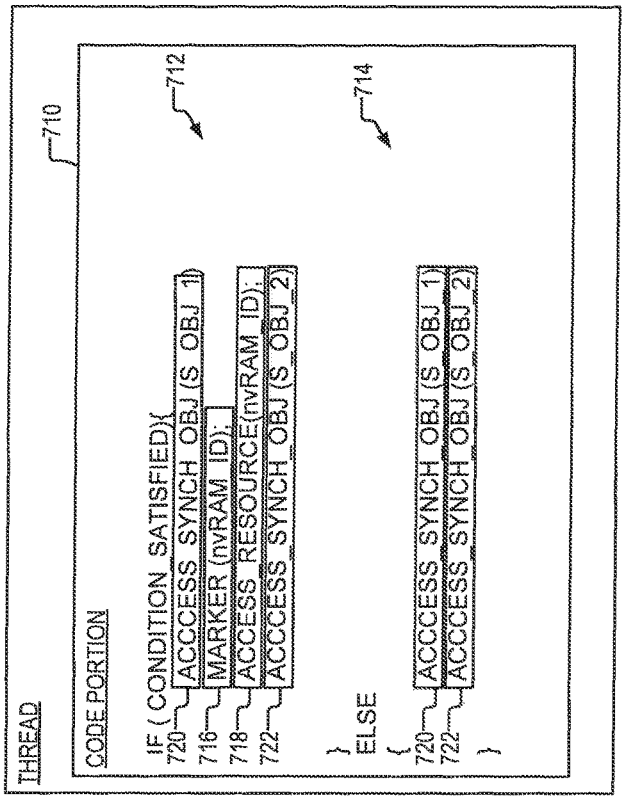
FIG. 7A is a diagram of an example of a thread in accordance with an illustrative embodiment.

FIG. 7A shows an example of a thread 700A including a code portion 710. The code portion 710 may include a section 712 and a section 714. Both sections 712 and 714 are predicated on the same condition. When the condition is satisfied, section 712 is executed. On the other hand, when the condition is not satisfied, section 714 is executed instead. According to the present example, section 712 includes a marker 716 that is placed before instruction(s) 718. Instruction(s) 718 are configured to access a resource whose use is not coordinated with any synchronization objects (e.g., nvRAM). The marker 716 may include one or more processor executable instructions that are configured to call the API implementing the counters from the second type.

Sections 712 and 714 differ from one another in that section 712 includes the marker 716 and instruction(s) 718, whereas the section 714 does not. However, sections 712 and 714 are similar to one another in that they both include instruction(s) 720 and instruction(s) 722. Instruction(s) 720 may include one or more processor-executable instructions that are configured to access a first synchronization object having a resource ID "S_OBJ_1". And instruction(s) 722 may include one or more processor-executable instructions that are configured to access a second synchronization object having a resource ID "S_OBJ_2".

Figure 7B:
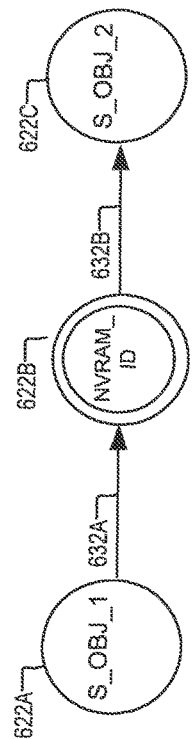
FIG. 7B is a diagram of an example of a flow graph corresponding to the thread of FIG. 7A in accordance with an illustrative embodiment.
Figure 7C:
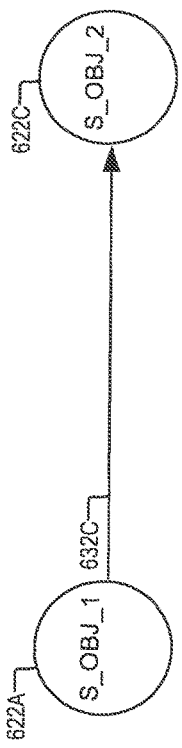
FIG. 7C is a diagram of another example of a flow graph corresponding to the thread of FIG. 7A in accordance with an illustrative embodiment.
Figure 7D:
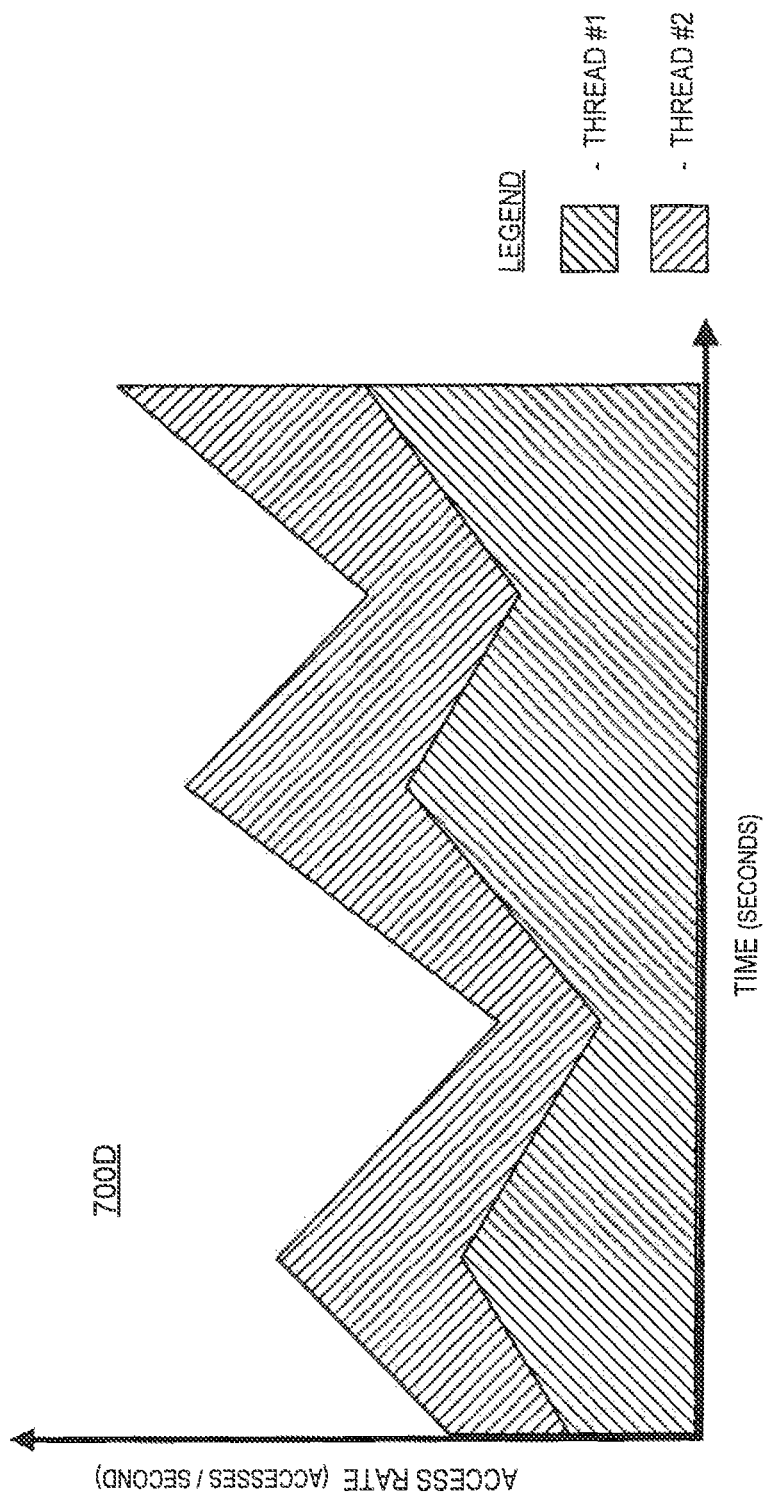
FIG. 7D is a diagram of an example of a plot in accordance with an illustrative embodiment.

According to the example of FIGS. 7A-C, the code portion 710 is executed twice, and a different flow graph is generated for each execution. In the first run, the condition in the code portion 710 is satisfied and section 712 is executed as a result (while section 714 is not executed). In the second run, the condition in the code portion 710 is not satisfied and section 714 is executed as a result (while section 712 is not executed). A flow graph 700B is generated for the first run, and a flow graph 700C is generated for the second run. Each of the flow graphs 700B and 700C may be generated in accordance with the process 400, which is discussed above with respect to FIGS. 4A-B.

As illustrated, the flow graphs 700B and 700C reflect the differences between sections 712 and 714. More particularly, flow graph 700B (corresponding to section 712) includes a node 622B (corresponding to the marker 716). The same node is not found in the flow graph 700C (corresponding to section 714) because section 714 does not include any markers. Furthermore, the edges 632 that are found in each of the flow graphs 700B and 700C may correspond to different processing sequences. According to the present example, the flow graph 700B may include nodes 622A, 622B, and 622C. Node 622A may represent the first synchronization object and node 622C may represent the second synchronization object. As noted above, node 622B, however, may represent the resource (e.g., nvRAM) that is monitored using the marker 716. The nodes 622A and 622B may be connected by an edge 632A representing instructions (not shown) from the section 712 that are executed after instruction(s) 720 and before the marker 716. The nodes 622B and 622C may be connected by an edge 632B representing instructions (not shown) from the section 712 that are executed after the marker 716 and before the instruction(s) 722. The flow graph 700C may include nodes 622A and 622C. Node 622A may represent the first synchronization object and node 622C may represent the second synchronization object. The nodes 622A and 622C may be connected by an edge 632C representing instructions (not shown) from the section 714 that are executed after instruction(s) 720 and before instruction(s) 722.

Although in the example of FIGS. 7A-C, the flow graphs 700B and 700C are depicted as separate entities, in some implementations they may be integrated together in the same graph. The flow graphs 700B and 700C are provided, in this example, to illustrate that the insertion of markers in the code of monitored threads may provide additional recording points for collecting performance data, which permits different sections of the code portion 710 to be monitored separately. The ability to monitor different sections of code separately may help distinguish between "long" and "short" passes of a processing sequence when performance data is analyzed and it can be a welcome addition to various tools used by software developers to analyze and debug the operation of software systems.

Figure 8:
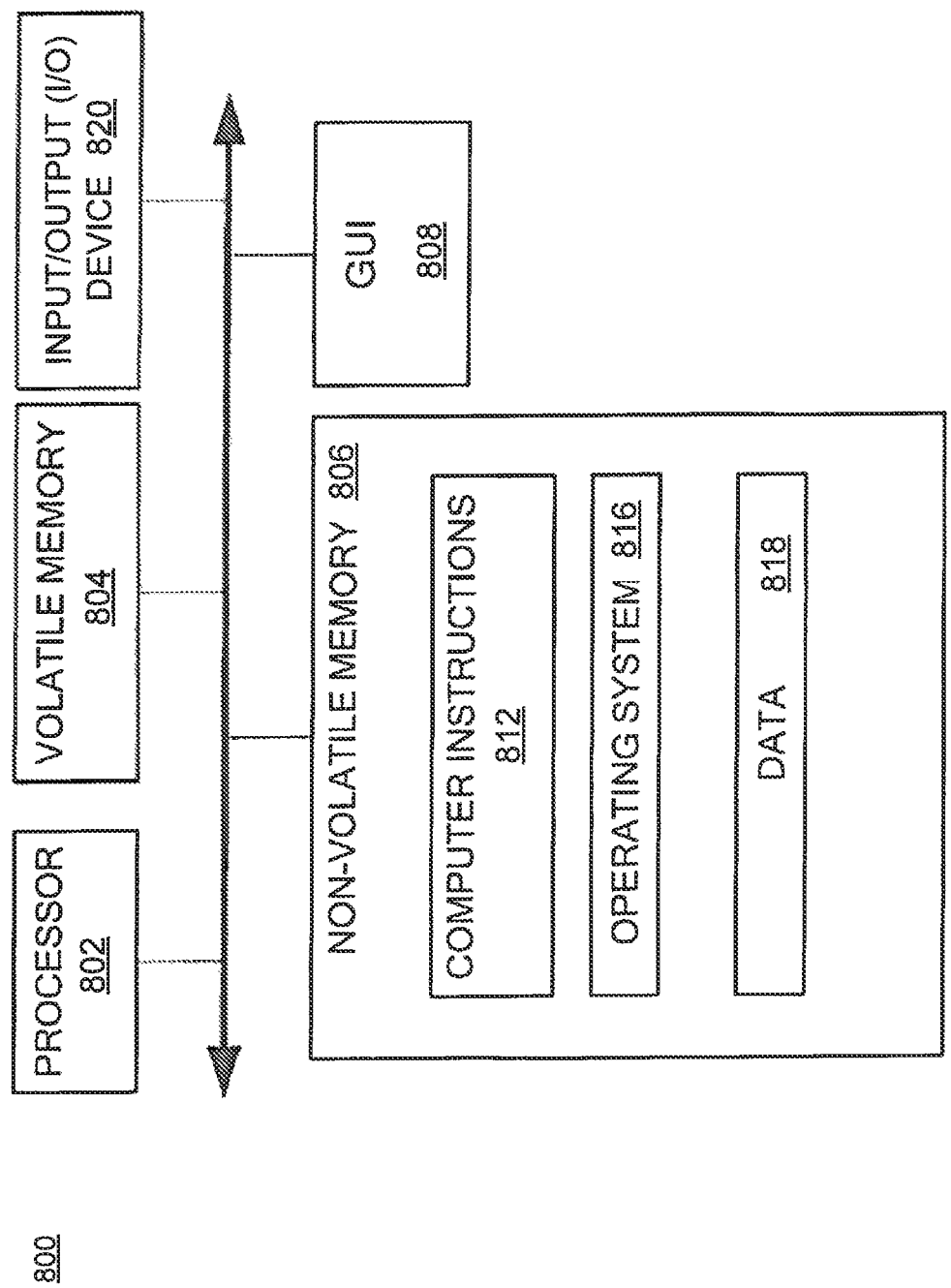

Referring to FIG. 8, in some embodiments, source site 102 and/or target site 112 may be implemented as one or more computers. Computer 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of processes 400 and 500. Program code may be applied to data entered using an input device of GUI 808 or received from I/O device 820.

Processes 400 and 500 (FIGS. 4 and 5) are not limited to use with the hardware and software of FIG. 8 and may find applicability in any computing or processing environment and with any type of machine or set of machines that may be capable of running a computer program. Processes 400 and 500 (FIGS. 4 and 5) may be implemented in hardware, software, or a combination of the two.

The processes described herein are not limited to the specific embodiments described. For example, processes 400 and 500 are not limited to the specific processing order shown in FIGS. 4 and 5. Rather, any of the blocks of processes 400 and 500 may be re-ordered, combined or removed, performed in parallel or in serial, as necessary, to achieve the results set forth herein.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general-purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
   executing a set of threads in a storage system, the set of threads including at least a first thread;
   executing a plurality of performance counters of the storage system, the plurality of performance counters being executed concurrently with the set of threads, the plurality of performance counters including at least: (i) a first performance counter that is executed when an operating state of the first thread is changed in response to the first thread accessing a synchronization object, and (ii) a second performance counter that is executed when a marker inserted in the first thread is executed;

generating one or more performance data containers associated the first thread based on performance data associated with the first thread; and generating a directed graph based on the performance data containers, the directed graph including a plurality of nodes connected to one another by a plurality of edges, the plurality of nodes including a first node corresponding to the synchronization object, and a second node corresponding to the marker.

2. The method of claim 1, wherein at least one of the plurality of edges extends between the first node and the second node, the edge corresponding to processor-executable instructions in the first thread that are executed after the first thread has accessed the respective synchronization object and before the marker is executed.

3. The method of claim 1, wherein the marker is inserted at a location in the first thread that corresponds to one or more processor-executable instructions for accessing a resource of the storage system that is not controlled via any synchronization objects that are part of an operating system executing the set of threads.

4. The method of claim 1, wherein the set of threads further includes a second thread having a different task identifier than the first thread, and the performance data containers include only performance data associated with threads from the set that have the same task identifier as the first thread.

5. The method of claim 1, wherein each of the plurality of edges is identified by a three-tuple edge key based upon a task identifier associated with the edge, a first resource identifier, and a second resource identifier, the first and second resource identifiers corresponding to different ones of the plurality of nodes that are connected to one another by the edge.

6. The method of claim 1, wherein:
the first node is associated with a first resource identifier corresponding to the synchronization object,
the second node is as associated with a second resource identifier corresponding to a resource of the storage system that is not controlled via any synchronization objects that are part of an operating system executing the set of threads; and
the marker includes one or more processor-executable instructions that are configured to provide the second performance counter with second resource identifier, and
the second performance counter includes one or more processor-executable instructions configured to map performance data associated the marker to the second resource identifier.

7. The method of claim 1, wherein:
the operating state of the first thread is changed by a scheduler of the storage system;
the first performance counter includes one or more processor-executable instructions that are part of the scheduler of the storage system; and
the second performance counter includes one or more processor-executable instructions that are part of the of an application programming interface (API) that is separate from the scheduler.

8. A system comprising:
a memory; and
one or more processors operatively coupled to the memory, the one or more processors being configured to perform the operations:
executing a set of threads in a storage system, the set of threads including at least a first thread;

executing a plurality of performance counters of the storage system, the plurality of performance counters being executed concurrently with the set of threads, the plurality of performance counters including at least: (i) a first performance counter that is executed when an operating state of the first thread is changed in response to the first thread accessing a synchronization object, and (ii) a second performance counter that is executed when a marker inserted in the first thread is executed;

generating one or more performance data containers associated the first thread based on performance data associated with the first thread; and generating a directed graph based on the performance data containers, the directed graph including a plurality of nodes connected to one another by a plurality of edges, the plurality of nodes including a first node corresponding to the synchronization object, and a second node corresponding to the marker.

9. The system of claim 8, wherein at least one of the plurality of edges extends between the first node and the second node, the edge corresponding to processor-executable instructions in the first thread that are executed after the first thread has accessed the respective synchronization object and before the marker is executed.

10. The system of claim 8, wherein the marker is inserted at a location in the first thread that corresponds to one or more processor-executable instructions for accessing a resource of the storage system that is not controlled via any synchronization objects that are part of an operating system executing the set of threads.

11. The system of claim 8, wherein each of the plurality of edges is identified by a three-tuple edge key based upon a task identifier associated with the edge, a first resource identifier, and a second resource identifier, the first and second resource identifiers corresponding to different ones of the plurality of nodes that are connected to one another by the edge.

12. The system of claim 8, wherein:
the first node is associated with a first resource identifier corresponding to the synchronization object,
the second node is as associated with a second resource identifier corresponding to a resource of the storage system that is not controlled via any synchronization objects that are part of an operating system executing the set of threads; and
the marker includes one or more processor-executable instructions that are configured to provide the second performance counter with second resource identifier, and
the second performance counter includes one or more processor executable instructions configured to map performance data associated the marker to the second resource identifier.

13. The system of claim 8, wherein each of the plurality of edges is identified by a three-tuple edge key based upon a task identifier associated with the edge, a first resource identifier, and a second resource identifier, the first and second resource identifiers corresponding to different ones of the plurality of nodes that are connected to one another by the edge.

14. The system of claim 8, wherein:
the operating state of the first thread is changed by a scheduler of the storage system;
the first performance counter includes one or more processor-executable instructions that are part of the scheduler of the storage system; and the second performance counter includes one or more processor-executable instructions that are part of the of an application programming interface (API) that is separate from the scheduler.

15. A non-transitory computer-readable medium storing processor-executable code, which when executed by at least one processor causes the at least one processor to execute the operations of:

executing a set of threads in a storage system, the set of threads including at least a first thread;

executing a plurality of performance counters of the storage system, the plurality of performance counters being executed concurrently with the set of threads, the plurality of performance counters including at least: (i) a first performance counter that is executed when an operating state of the first thread is changed in response to the first thread accessing a synchronization object, and (ii) a second performance counter that is executed when a marker inserted in the first thread is executed;

generating one or more performance data containers associated the first thread based on performance data associated with the first thread; and generating a directed graph based on the performance data containers, the directed graph including a plurality of nodes connected to one another by a plurality of edges, the plurality of nodes including a first node corresponding to the synchronization object, and a second node corresponding to the marker.

16. The non-transitory computer-readable medium of claim 15, wherein at least one of the plurality of edges extends between the first node and the second node, the edge corresponding to processor-executable instructions in the first thread that are executed after the first thread has accessed the respective synchronization object and before the marker is executed.

17. The non-transitory computer-readable medium of claim 15, wherein the marker is inserted at a location in the first thread that corresponds to one or more processor-executable instructions for accessing a resource of the storage system that is not controlled via any synchronization objects that are part of an operating system executing the set of threads.

18. The non-transitory computer-readable medium of claim 15, wherein the set of threads further includes a second thread having a different task identifier than the first thread, and the performance data containers include only performance data associated with threads from the set that have the same task identifier as the first thread.

19. The non-transitory computer-readable medium of claim 15, wherein each of the plurality of edges is identified by a three-tuple edge key based upon a task identifier associated with the edge, a first resource identifier, and a second resource identifier, the first and second resource identifiers corresponding to different ones of the plurality of nodes that are connected to one another by the edge.

20. The non-transitory computer-readable medium of claim 15, wherein:

the first node is associated with a first resource identifier corresponding to the synchronization object, the second node is as associated with a second resource identifier corresponding to a resource of the storage system that is not controlled via any synchronization objects that are part of the operating system executing the set of threads; and the marker includes one or more processor-executable instructions that are configured to provide the second performance counter with second resource identifier, and the second performance counter includes one or more processor-executable instructions configured to map performance data associated the marker to the second resource identifier.

* * * * *